(12) United States Patent
Sakai (10) Patent No.: US 7,898,647 B2
(45) Date of Patent: Mar. 1, 2011

(54) DISTANCE MEASURING APPARATUS

(75) Inventor: Hiroshi Sakai, Yokohama (JP)

(73) Assignees: Nikon Vision Co., Ltd., Tokyo (JP);
Nikon Corporation, Tokyo (JP)

( * ) Notice: Subject to any disclaimer, the term of this patent is extended or adjusted under 35 U.S.C. 154(b) by 250 days.

(21) Appl. No.: 11/921,871

(22) PCT Filed: Jul. 3, 2006

(86) PCT No.: PCT/JP2006/313223
§ 371 (c)(1),
(2), (4) Date: Dec. 10, 2007

(87) PCT Pub. No.: WO2007/004606
PCT Pub. Date: Jan. 11, 2007

(65) Prior Publication Data
US 2009/0115992 A1    May 7, 2009

(30) Foreign Application Priority Data
Jul. 4, 2005 (JP) ................. 2005-195367

(51) Int. Cl.
*G01C 3/08* (2006.01)

(52) U.S. Cl. ..................................... 356/5.01

(58) Field of Classification Search ......... 356/3.01–28.5
See application file for complete search history.

(56) References Cited

U.S. PATENT DOCUMENTS

| | | |
|---|---|---|
| 6,429,941 B1 | 8/2002 | Kamon et al. |
| 2002/0036765 A1* | 3/2002 | McCaffrey et al. .......... 356/5.08 |
| 2002/0145725 A1* | 10/2002 | Ogawa et al. ................ 356/5.01 |
| 2004/0070748 A1 | 4/2004 | Inaba et al. |
| 2005/0046823 A1 | 3/2005 | Ando et al. |

FOREIGN PATENT DOCUMENTS

| | | |
|---|---|---|
| CN | 1503914 A | 6/2004 |
| JP | A-05-223928 | 9/1993 |
| JP | A-05-232229 | 9/1993 |
| JP | A-07-071957 | 3/1995 |

(Continued)

OTHER PUBLICATIONS

Notification of the First Office Action issued in Chinese Patent Application No. 200680024253.6; May 10, 2010; with English-language translation.

*Primary Examiner* — Thomas H Tarcza
*Assistant Examiner* — Luke D Ratcliffe
(74) *Attorney, Agent, or Firm* — Oliff & Berridge, PLC (57) ABSTRACT

A distance measuring apparatus, which can achieve reduction in cost and size and perform measurement ranging from short-distance to long-distance accurately, includes an unit outputting first pulsed light L1 to a measurement object, an unit detecting first pulsed light L2 reflected by the measurement object to output a signal responsive to an intensity variation thereof, a measuring unit measuring a time difference between output and detection of the first pulsed light during a period when an intensity of the signal is larger than a predetermined value, a measuring unit measuring the time difference at a time when an intensity of the signal varies from less than a predetermined value to the predetermined value or more, and an unit calculating a distance to the measurement object using a time difference measured by at least one of the two measuring units.

7 Claims, 7 Drawing Sheets

FOREIGN PATENT DOCUMENTS

| JP | A-07-174842 | 7/1995 |
| JP | A-07-191145 | 7/1995 |
| JP | A-08-086874 | 4/1996 |
| JP | A-2000-028721 | 1/2000 |
| JP | A-2004-125559 | 4/2004 |
| JP | A-2004-226069 | 8/2004 |
| JP | A-2005-077379 | 3/2005 |

* cited by examiner

(a) LEVEL SAMPLING CIRCUIT 20

(b) EDGE SAMPLING CIRCUIT 21

(a) WHEN PULSE WIDTH IS NORMAL (b) WHEN PULSE WIDTH IS EXTENDED

Fig. 8

(a) WHEN PULSE WIDTH IS NORMAL (b) WHEN PULSE WIDTH IS EXTENDED

DISTANCE MEASURING APPARATUS

This application is a U.S. National Stage application claiming the benefit of prior filed International Application Number PCT/JP2006/313223, filed Jul. 3, 2006, in which the International Application claims a priority date of Jul. 4, 2005 based on prior filed Japanese Application Number 2005-195367 the entire contents of which are incorporated herein by reference.

TECHNICAL FIELD

The present invention relates to a distance measuring apparatus measuring a distance.

BACKGROUND ART

A distance measuring apparatus is known which allows pulsed light to bounce back and forth between a distance measuring apparatus and a measurement object, and measures time required for its round trip to measure the distance to the measurement object (see patent document 1, for example). In this apparatus, when pulsed light reflected by the measurement object is detected, signal is amplified through an amplifier, and the shorter the round-trip time of the pulsed light, the smaller the gain of the amplifier is set. For this reason, short-distance can be measured while avoiding the saturation of the amplifier, and thereby short-distance to long-distance measurement can be performed accurately. As an amplifier capable of gain adjustment as described above, for example, an automatic gain control (AGC) amplifier, a sensitivity time control (STC) amplifier, or the like is known.

In addition, when strong reflected light from a measurement object enters a receiver, an input voltage of an amplifier may suddenly increases to a specified value or more. In this case, there is a case that much time is required before the voltage of the amplifier stabilizes again to a region where the amplifier functions normally, and during this time, the receiver becomes unable to receive reflected light normally. This state is the saturation of the amplifier.

Patent Document 1: Japanese Unexamined Patent Application Publication No. Hei7-71957

DISCLOSURE

Problems to be Solved

An amplifier capable of gain adjustment as described above is however higher in cost and larger in circuit scale than a typical amplifier having a fixed gain, thereby inhibiting cost reduction and miniaturization of a distance measuring apparatus.

It is therefore an object of the present invention to provide a distance measuring apparatus which can achieve reduction in cost and size and perform measurement ranging from short distance to long distance accurately.

Means for Solving the Problems

The distance measuring apparatus of the present invention includes an output unit outputting first pulsed light to a measurement object, a light detecting unit detecting first pulsed light reflected by the measurement object and outputting a signal responsive to an intensity variation of the first pulsed light, a first measuring unit measuring a time difference between output and detection of the first pulsed light during a period when an intensity of the signal is larger than a predetermined value, a second measuring unit measuring a time difference between output and detection of the first pulsed light at a time when an intensity of the signal varies from less than a predetermined value to the predetermined value or more, and a calculating unit calculating a distance to the measurement object using a time difference measured by at least one of the first measuring unit and the second measuring unit.

Furthermore, the calculating unit preferably selects a time difference by the first measuring unit or a time difference by the second measuring unit according to elapsed time from output of the first pulsed light; and calculates a distance to the measurement object.

Furthermore, the calculating unit preferably selects a time difference by the first measuring unit or a time difference by the second measuring unit according to an external operation by a measurer to calculate a distance to the measurement object.

Furthermore, the distance measuring apparatus preferably further includes an estimating unit estimating a background level of the first pulsed light before output of the first pulsed light, wherein the calculating unit selects a time difference by the first measuring unit or a time difference by the second measuring unit according to the background level, and calculates a distance to the measurement object.

Furthermore, the calculating unit preferably selects a time difference by the first measuring unit or a time difference by the second measuring unit according to an intensity of the first pulsed light, and calculates a distance to the measurement object.

Furthermore, the output unit preferably outputs a plurality of the first pulsed lights in sequence and the calculating unit produces a frequency distribution related to at least one of a time difference by the first measuring unit and a time difference by the second measuring unit, selects a time difference by the first measuring unit or a time difference by the second measuring unit according to frequencies in sections in which time differences are less than a predetermined value in the frequency distribution, and calculates a distance to the measurement object.

Furthermore, the first measuring unit binarizes the signal, latches an intensity of a signal generated by the binarization asynchronously with a sampling clock of a predetermined frequency, and then samples the intensity at a first rising edge of the sampling clock and clears the intensity at a second rising edge to measure the time difference, and the second measuring unit binarizes the signal and measures the time difference by latching an intensity of a signal generated by the binarization at a rising edge of the sampling clock.

Effect

The distance measuring apparatus of the present invention can achieve reduction in cost and size and perform measurement ranging from short distance to long distance accurately.

BRIEF DESCRIPTION OF THE DRAWINGS

FIG. 10 is a schematic diagram illustrating an internal configuration of an MPU 25 of the distance measuring apparatus 10, and the like.

DETAILED DESCRIPTION OF THE EMBODIMENTS

An embodiment of the present invention will be described in detail below with reference to the drawings.

Figure 1:
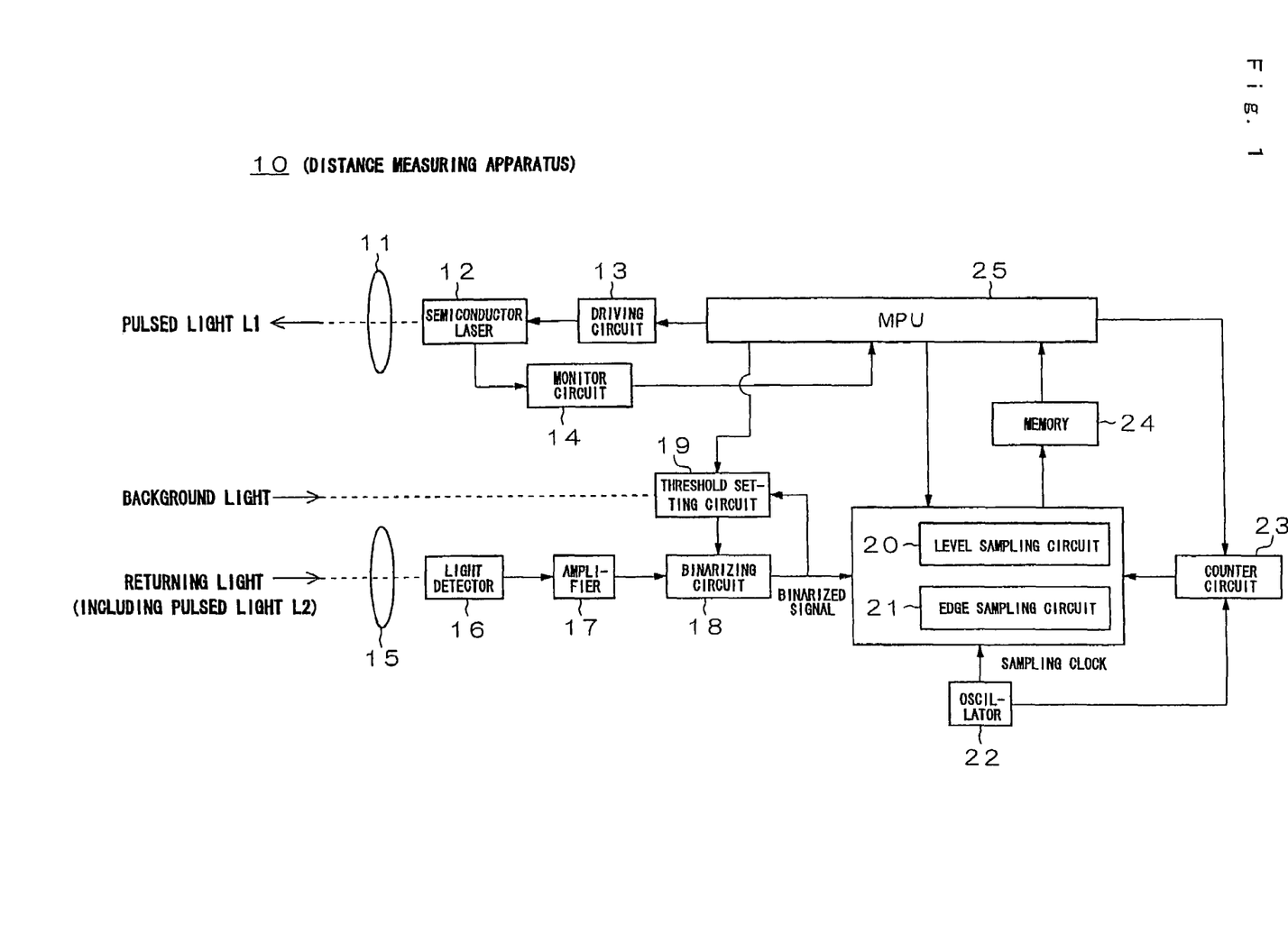
FIG. 1 is a block diagram showing an internal configuration of a distance measuring apparatus 10 of the embodiment.

A distance measuring apparatus 10 of the embodiment includes, as shown in FIG. 1, a collimating lens 11, a semiconductor laser 12, a driving circuit 13, a monitor circuit 14, a condensing lens 15, a light detector 16, an amplifier 17, a binarizing circuit 18, a threshold setting circuit 19, a level sampling circuit 20, an edge sampling circuit 21, an oscillator 22, a counter circuit 23, a memory 24, and a MPU 25.

When a measurement starting button which is not shown in the figure is operated by a measurer and a measurement starting command is input, the MPU 25 outputs a light-emitting command to the semiconductor laser 12 via the driving circuit 13, and controls the light-emitting timing of the semiconductor laser 12. Control of the light-emitting timing by the MPU 25 is performed repeatedly at a predetermined time interval (e.g. 550 times).

The semiconductor laser 12 is a light-emitting device outputting pulsed light L1 to a measurement object not shown in the figure, and outputs a plurality of pulsed lights L1 in sequence according to control of the light-emitting timing by the MPU 25. The timing of actually outputting each of the pulsed lights L1 is monitored by the monitor circuit 14 and is output to the MPU 25. The MPU 25 performs various timing controls using the actual light-emitting timing as a basis of time measurement.

Pulsed light L1 from the semiconductor laser 12 passes through the collimating lens 11 and is then irradiated to the measurement object. Pulsed light L2 reflected by the measurement object, pulsed light reflected by other obstacles (such as rain), background light, and the like (generally referred to as "returning light") pass through the condensing lens 15 and then enter the light detector 16. The light detector 16 is, for example, a light-receiving device such as a photodiode, and performs photoelectric conversion of returning light in time series to output it to the amplifier 17.

Figure 2:
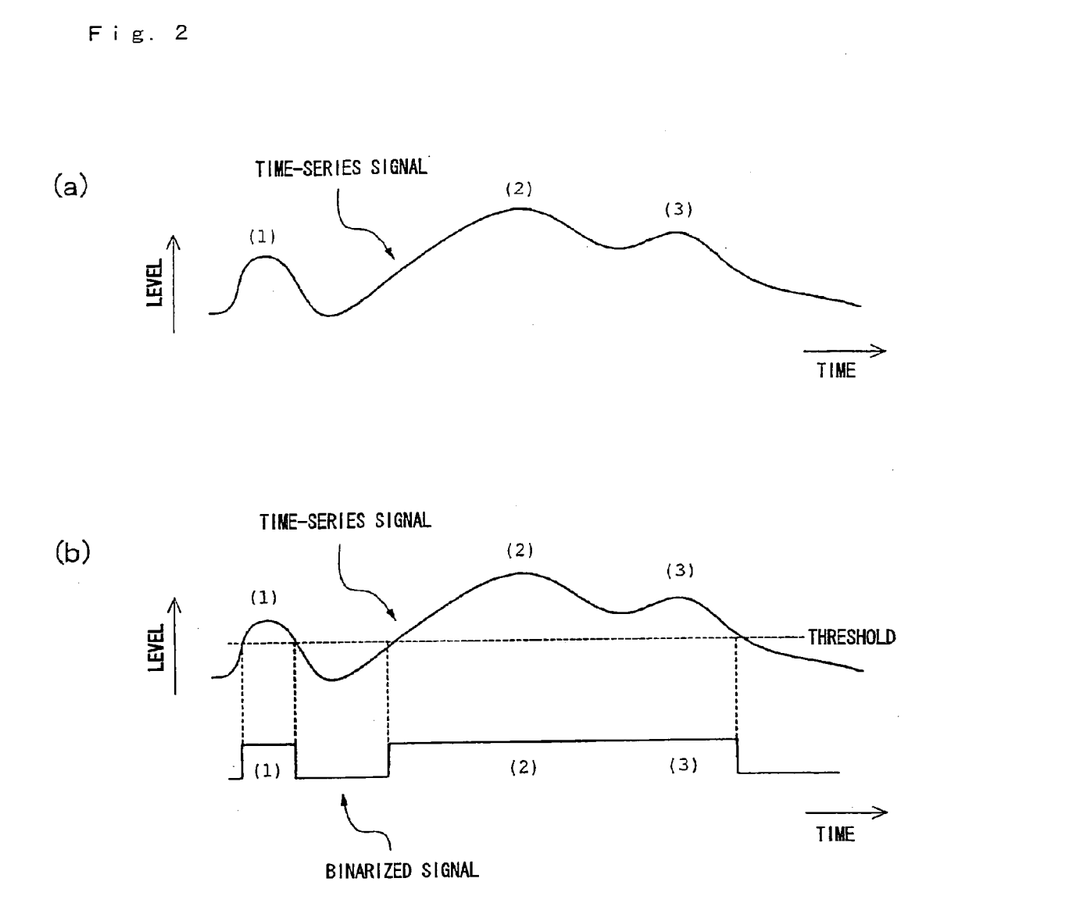
FIG. 2 illustrates a time-series signal (a) responsive to an intensity variation of a returning light and its binarized signal (b)

The amplifier 17 is a typical amplifier having a fixed gain and is lower in cost and smaller in circuit scale than the above conventional amplifier capable of gain adjustment. The amplifier 17 amplifies a signal from the light detector 16 in time series according to the fixed gain. Since the light detector 16 and the amplifier 17 are provided, returning lights are detected in time series, and a time-series signal (FIG. 2(a)) responsive to an intensity variation of returning lights is output to the binarizing circuit 18. Here, the time-series signal means a group of data (intensity data of returning lights) which varies with the elapse of time, and "detected in time series" means sequential detection with the elapse of time.

In FIG. 2(a), three pulses (1) to (3) appear on a time-series signal. These pulses (1) to (3) are caused by, for example, pulsed lights L2 reflected by a measurement object, pulsed lights reflected by other obstacles (such as rain), and the like. However, it is difficult at this time point to differentiate between true pulsed light L2 and false pulsed light L2 (noise component).

Furthermore, the typical amplifier 17 used in this embodiment may be saturated when the intensities of pulsed lights L2 reflected by a measurement object are large. There is a case that a pulse width of a time-series signal extends more than the actual pulse width if the amplifier is saturated.

As show in FIG. 2(b), a time-series signal from the amplifier 17 is input to the binarizing circuit 18, which binarizes the signal according to a predetermined threshold to generate a binarized signal. The predetermined threshold used at that time is a threshold for reducing noises and is automatically set by the threshold setting circuit 19 in advance. The binarized signal in FIG. 2(b) becomes high in level in regions corresponding to the pulses (1) to (3) of the time-series signal to be pulses (1) to (3).

The threshold setting circuit 19 detects the intensity of background light, before pulsed light L1 is output from the semiconductor laser 12 (for example, just after the measurement starting command by a measurer), according to a setting command from the MPU 25. The threshold setting circuit 19 then estimates a background level of returning light from the intensity of the background light and automatically sets a threshold according to the background level. For example, it is desirable to set the peak value of the background level as the threshold. The background level corresponds to a noise level in the measuring environment. In addition to this method, the threshold may be automatically set based on returning light L2.

The binarized signal (FIG. 2(b)) generated by the binarizing circuit 18 is output to the level sampling circuit 20 and the edge sampling circuit 21. Furthermore, to each of the sampling circuits (20, 21), a sampling clock (see FIG. 3) of a specific frequency is input from the oscillator 22, and a value counted by the counter circuit 23 is also input. The counted value is reset by the MPU 25 at a time when the semiconductor laser 12 actually outputs pulsed light L1.

Figure 3:
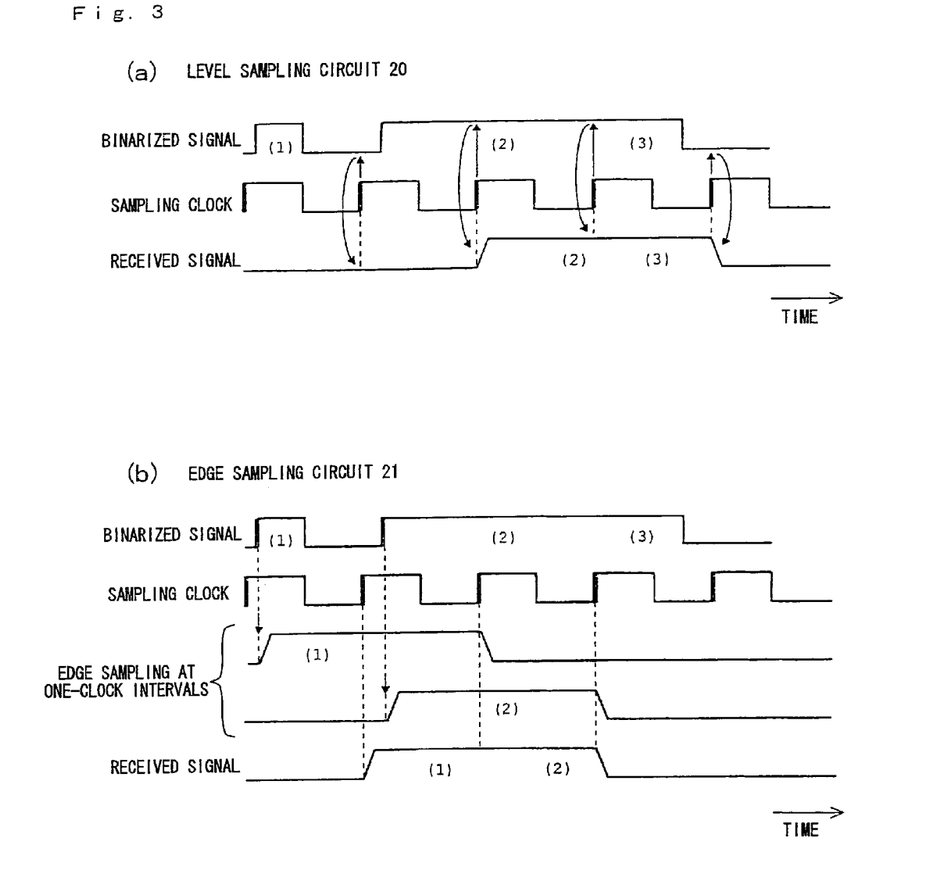
FIG. 3 illustrates digital sampling (a) of a binarized signal in a level sampling circuit 20 and digital sampling (b) of a binarized signal in an edge sampling circuit 21.

As schematically shown in FIGS. 3(a) and 3(b), the level sampling circuit 20 and the edge sampling circuit 21 perform digital sampling of a binarized signal according to a sampling clock to generate received signals synchronized with the sampling clock. Then, they read a counted value of the counter circuit 23 and output it to the memory 24 during a period when the received signals are high.

However, a counted value actually output to the memory 24 is either one of the counted value by the level sampling circuit 20 and the counted value by the edge sampling circuit 21. In this embodiment, as shown in, for example, FIG. 4, a selector 26 is provided after the level sampling circuit 20 and the edge sampling circuit 21, and the MPU 25 performs switching control of the selector 26 to allow it to output either one of the counted values to the memory 24.

Figure 5:
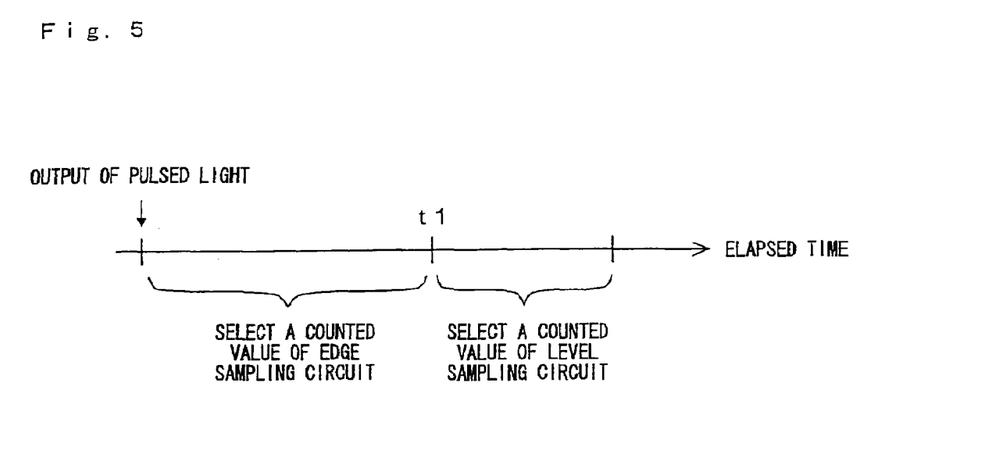
FIG. 5 illustrates switching control of the selector 26 according to elapsed time from output of pulsed light L1.

Furthermore, the MPU 25 automatically performs switching control of the selector 26, as shown in, for example, FIG. 5, according to the elapsed time from output of pulsed light L1 by the semiconductor laser 12. In other words, before predetermined time t1 passes after output of pulsed light L1 (while the amplifier 17 is generally able to be saturated due to strong pulsed light L2 reflected by a measurement object), a counted value by the edge sampling circuit 21 is selected and output to the memory 24. After the predetermined time t1 (while the amplifier 17 is not saturated because pulsed light L2 is weak), a counted value by the level sampling circuit 20 is selected and output to the memory 24.

The level sampling circuit 20 latches, as shown in FIG. 3(*a*), levels of the binarized signal at rising edges of the sampling clock to generate a received signal. When the sampling clock rises during a period when the binarized signal is high (a period when the level of the time-series signal in FIG. 2(*b*) is higher than the threshold), the level sampling circuit 20 determines that pulsed light L2 reflected by the measurement object has been detected and makes the level of the received signal high. When the sampling clock rises during a period when the binarized signal is low, the level sampling circuit 20 determines that pulsed light L2 has not been detected and makes the level of the received signal low. The level sampling circuit 20 measures a time difference between output of pulsed light L1 and detection of pulsed light L2 during a period when the received signal is high and outputs a counted value of the counter circuit 23 to the selector 26 in FIG. 4.

Such a level sampling circuit 20 determines whether pulsed light L2 has been detected or not, according to a high or low state of the binarized signal, whenever the sampling clock rises, so that the level sampling circuit 20 is basically able to measure time differences of all pulsed lights L2. However, when a period when the binarized signal is high is shorter than the cycle of the sampling clock (for example, the period of pulse (1) of the binarized signal, or the like) or is not able to satisfy setup/hold of logic, there may be a case that the measurement can not be performed. The example of FIG. 3(*a*) represents that the measurement was not performed in the period of pulse (1), but was performed in the periods of pulses (2) and (3).

Furthermore, in the level sampling circuit 20, when the pulse width of the time-series signal in FIG. 2 is an abnormal value larger than the actual pulse width due to the saturation of the amplifier 17, the pulse width of the binarized signal in FIGS. 2(*b*) and 3(*a*) extends by just the amount and a period when the received signal is high also thus extends, so that the time difference of pulsed light L2 can not be measured accurately. In other words, a counted value output from the level sampling circuit 20 to the selector 26 in FIG. 4 becomes inaccurate.

For this reason, in this embodiment, a counted value by the level sampling circuit 20 is selected and output to the memory 24 after the predetermined time t1 in FIG. 5 (while the amplifier 17 is not saturated because the pulsed light L2 is weak). In this period, the amplifier 17 is not saturated and the pulse width of the binarized signal in FIG. 3(*a*) indicates a normal value, so that a period when the received signal is high also indicates an normal value, the time difference of pulsed light L2 can be measured accurately, and an accurate counted value can be output to the memory 24. Furthermore, even if the S/N ratio is low, an accurate counted value can be output to the memory 24.

Here, it is recommended that the predetermined time t1 in FIG. 5 is set based on, for example, a reflected pulse from an object in the distance of 50 m from the distance measuring apparatus. However, the predetermined time t1 may be set in such a manner that a user is able to change the set value of the controller appropriately in consideration of the use environment and the like of the distance measuring apparatus.

On the other hand, the edge sampling circuit 21 performs latching, as shown in FIG. 3(*b*), asynchronously with the sampling clock, at rising edges of the binarized signal. After the asynchronous latch, sampling is performed at a rising edge of the first sampling clock, and the asynchronous latch is cleared at a rising edge of the second sampling clock (in order to secure setup/hold). If two signals are synthesized at one-clock intervals, masking is not performed.

In this case, it is determined that pulsed light L2 has been detected at rising edges of the binarized signal (at times when the level of the time-series signal in FIG. 2(*b*) changes from less than the threshold to the threshold or more) to make the edge sample high. After that, when a first sampling clock rises, the level of the received signal is made high. Furthermore, when a second sampling clock rises independently with a fall of the binarized signal, the edge sample is made low and the level of the received signal is made low. However, even if one of two edge samples is made low in the state that the other one is high, the level of the received signal is not made low and the high state of it is kept.

Such an edge sampling circuit 21 is able to measure the time difference of pulsed light L2 asynchronously with the timing of a rising edge of the binarized signal without being restrained to the cycle of the sampling clock. However, when hold time is too short because a period when the binarized signal is high is short, there may be a case that the measurement can not be performed.

Furthermore, the edge sampling circuit 21 is not able to measure the time difference of pulsed light L2 accurately when the S/N ratio decreases and a rising edge of the binarized signal becomes unclear (the position of a rising edge of the signal becomes hard to be detected against a noise). In other words, a counted value output from the edge sampling circuit 21 to the selector 26 in FIG. 4 becomes inaccurate. For example, when the pulse (3) in FIG. 3(*b*) is caused by true pulsed light L2 and the pulse (2) before the pulse (3) is caused by false pulsed light L2 (for example, a noise component reflected by a raindrop or the like), if the rising edge of the pulse (3) becomes unclear under the influence of the noise component, the counted value becomes inaccurate.

For this reason, in this embodiment, a counted value by the edge sampling circuit 21 is selected and output to the memory 24 before predetermined time t1 passes after output of pulsed light L1 shown in FIG. 5 (while the amplifier 17 is able to be saturated due to strong pulsed light L2 reflected by the measurement object). In this period of time, the S/N ratio is high and rising edges of the binarized signal in FIG. 3(*b*) are clear, so that the time difference of pulsed light L2 can be measured accurately and an accurate counted value can be thus output to the memory 24. Furthermore, even if the amplifier 17 is saturated, an accurate counted value can be output to the memory 24.

As described above, in the distance measuring apparatus 10 of this embodiment, a counted value by the edge sampling circuit 21 is output to the memory 24 before predetermined time t1 passes after output of pulsed light L1 by the semiconductor 12 (while the amplifier 17 is able to be saturated due to pulsed light L2), and a counted value by the level sampling circuit 20 is output to the memory 24 after the predetermined time t1 (while the amplifier 17 is not saturated because pulsed light L2 is weak).

However, when a plurality of counted values is obtained due to one pulsed light L1 and the minimum counted value is smaller than a counted value corresponding to the predetermined time t1, it is desirable that only the minimum counted value is employed and output to the memory 24, and counted values after it are excluded. Even if the amplifier 17 is saturated, the minimum counted value obtained by the edge sampling circuit 21 is accurate. Furthermore, counted values after it become inaccurate if the amplifier 17 operates abnormally due to the saturation of the amplifier 17. Thus, in a case as described above, inaccurate counted values detected by mistake can be excluded by employing only the minimum counted value.

Figure 6:
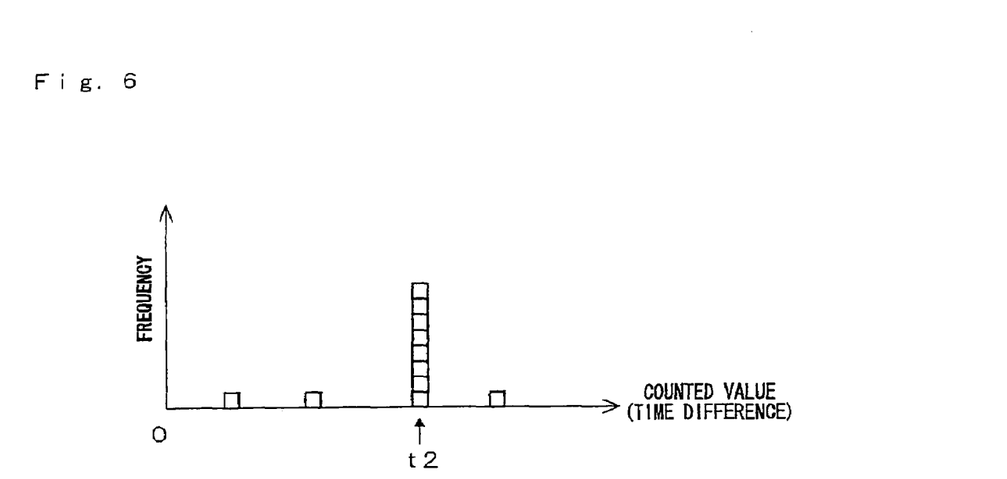
FIG. 6 shows a frequency distribution of counted values (time differences) stored in a memory 24 as a histogram.

In addition, in the distance measuring apparatus 10 of this embodiment, whenever the semiconductor laser 12 repeats output of pulsed light L1, time difference measurement (output of a counted value to the memory 24) as described above is repeated. As a result of such repetitions, in the memory 24, many counted values are stored according to the number of repetitions (e.g. 550) and a frequency distribution of counted values is produced. The frequency distribution is shown as a histogram in, for example, FIG. 6.

When finishing the control of light-emitting timing of the semiconductor laser 12, the MPU 25 calculates the distance to the measurement object using counted values stored in the memory 24 (time differences between output of pulsed light L1 and detection of pulsed light L2). In other words, the MPU calculates the distance to the measurement object by multiplying the speed of light by the time difference t2 of a section having the maximum frequency in the frequency distribution of counted values shown in, for example, FIG. 6. In this case, when the frequency of the sampling clock is 80 MHz (the cycle is 12.5 nsec), the distance can be measured with the resolution of 1.9 m.

The distance measuring apparatus 10 of this embodiment includes the level sampling circuit 20 and the edge sampling circuit 21 and measures a distance using a time difference measured by either one of the level sampling circuit 20 and the edge sampling circuit 21, so that it is able to perform short-distance to long-distance measurement also when amplifying a signal using a typical amplifier 17 having a fixed gain. In addition, since a typical amplifier 17 is used, cost reduction and miniaturization of the distance measuring apparatus 10 can be implemented.

Furthermore, as shown in FIG. 5, either one of the level sampling circuit 20 and the edge sampling circuit 21 is automatically selected according to the elapsed time from output of pulsed light L1, so that the selection can be performed simply and appropriately.

In addition, a counted value by the edge sampling circuit 21 is selected before predetermined time t11 passes after output of pulsed light L1, so that even if the amplifier 17 is saturated, an accurate counted value can be obtained, while a counted value by the level sampling circuit 20 is selected after the predetermined time t1, so that even if the S/N ratio is low, an accurate value can be obtained. In other words, in spite of the elapsed time from output of pulsed light L1, an accurate value can be always obtained. Thus, accurate short-distance to long-distance measurement can be surely performed.

Furthermore, since a counted value by the edge sampling circuit 21 is selected before predetermined time t1 passes after output of pulsed light L1, accurate measurement can be performed without being affected by a pulse width also when the center of gravity is calculated using a delay circuit described in Japanese Unexamined Patent Application Publication No. 2002-328170.

Outline of such a measuring method will be described below. When controlling the light-emitting timing of the semiconductor laser 12, the MPU 25 produces a frequency distribution (a histogram in FIG. 6) as described above while shifting the light-emitting timing sequentially by a predetermined amount (e.g. the order of a quarter of the sampling clock) using a delay circuit. Then it calculates a time difference between output of pulsed light L1 and detection of pulsed light L2 by calculating the center of gravity in a predetermined section (e.g. a section of three clocks) of the obtained frequency distribution, and measures the distance using the result of the calculation.

Figure 7:
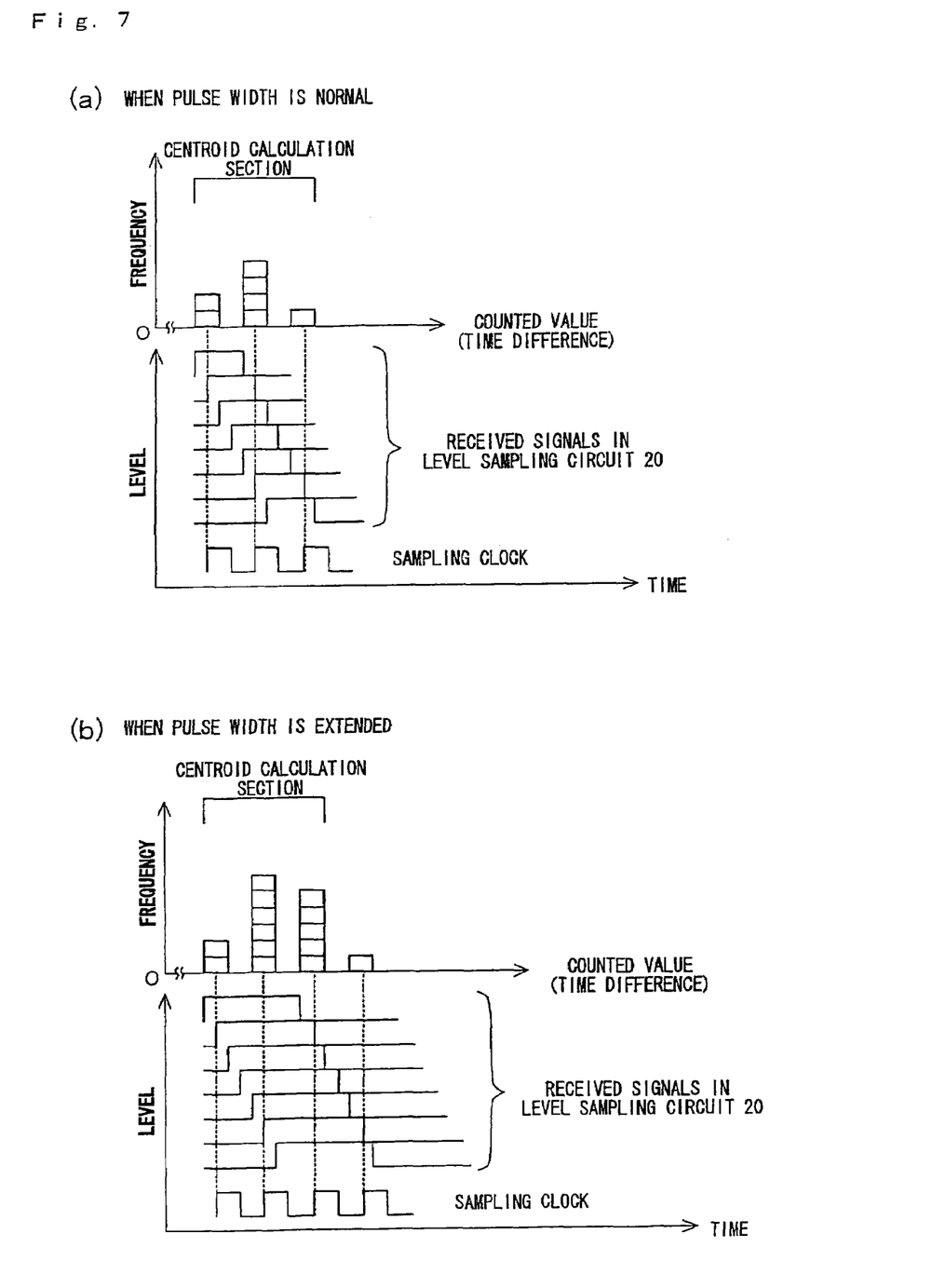
FIG. 7 illustrates received signals in the level sampling circuit 20 when a delay circuit is used, and variation sections (and centroid calculation sections) of histograms.

Here, it is tentatively considered that a counted value by the level sampling circuit 20 is selected even if the pulse width has been extended before predetermined time t1 passes after output of pulsed light L1. In this case, as understood from a comparison between the histograms of FIG. 7(a) and FIG. 7(b), the variation section of a histogram extends to the extent that the pulse width has extended, so that even if the center of gravity is calculated in a predetermined section, an accurate center of gravity (a time difference between output of pulsed light L1 and detection of pulsed light L2) can not be calculated.

Figure 8:
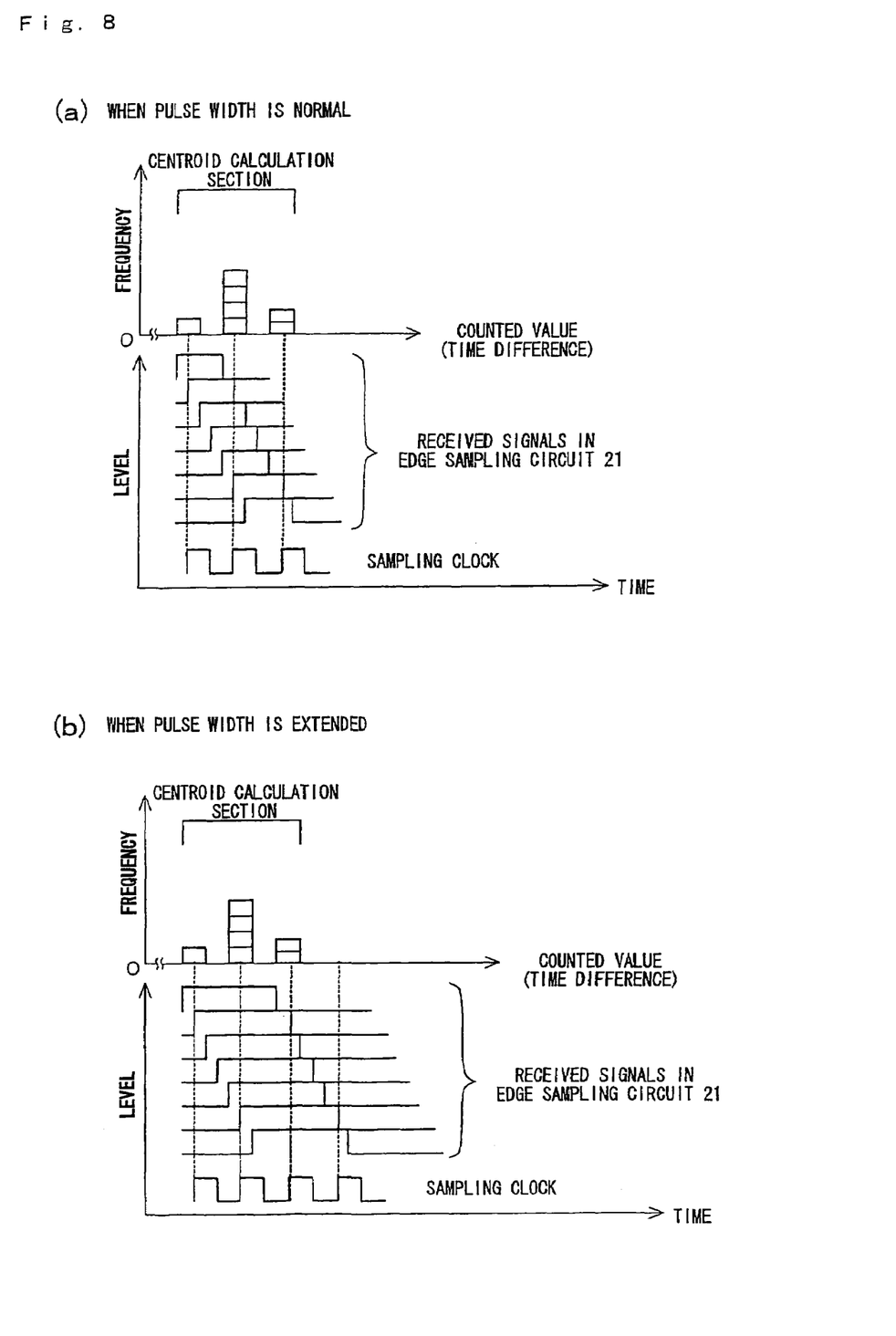
FIG. 8 illustrates received signals in the edge sampling circuit 21 when a delay circuit is used, and variation sections (and centroid calculation sections) of histograms.

In contrast to this, when a counted value by the edge sampling circuit 21 is selected before predetermined time t1 passes after output of pulsed light L1 as this embodiment, even if the pulse width has extended, the variation section of a histogram does not change as understood from a comparison between the histograms of FIGS. 8(a) and 8(b). For this reason, an accurate center of gravity (a time difference between output of pulsed light L1 and detection of pulsed light L2) can be always calculated by calculating a center of gravity in a predetermined section. Thus, the distance measurement resolution can be increased to the extent of the amount of shift of the light-emitting timing of the semiconductor laser 12.

(Variation 1)

In the above embodiment, the edge sampling circuit 21 performs latching asynchronously with the sampling clock at rising edges of the binarized signal (FIG. 3(b)). However, the present invention is not limited to this. When the degree of saturation of the amplifier is small or it does not exist, latching may be performed with falling edges of the binarized signal asynchronously.

In addition, in the above embodiment, predetermined time t1 for switching control of the selector 26 is set according to whether the amplifier 17 is saturated or not. However, the present invention is not limited to this. For example, when the saturation of the amplifier is expected, the predetermined time t1 may be set according to the level of the S/N ratio. In this case, it is desirable that a counted value by the edge sampling circuit 21 be selected before the predetermined time t1 passes after output of pulsed light t1 (while the pulsed light L2 is strong and the S/N ratio is high), and a counted value from the level sampling circuit 20 be selected after the predetermined time t1 (while the pulsed light L2 is weak and the S/N ratio is low).

Furthermore, in the above embodiment, a binarized signal from the binarizing circuit 18 is output to both of the level sampling circuit 20 and the edge sampling circuit 21, each of which measures a time difference between output of pulsed light L1 and detection of pulsed light L2, and either one of the time differences (counted value) is output to the memory 24 by switching control of the selector 26. However, the present invention is not limited to this. The selector 26 may be omitted and each of the level sampling circuit 20 and the edge sampling circuit 21 may have a dedicated memory in order that the MPU 25 selects the counted value (time differences) stored in either one of the memories when calculating a distance. Furthermore, a binarized signal from the binarizing circuit 18 may be distributed to the level sampling circuit 20 or the edge sampling circuit 21 in order that a time difference (counted value) measured by either one of the level sampling circuit 20 and the edge sampling circuit 21 is output to the memory 24.

In addition, in the above embodiment, switching control of the selector 26 is performed according to the elapsed time from output of pulsed light L1, and a counted value by the level sampling circuit 20 or a counted value by the edge sampling circuit 21 is selected (FIG. 5). However, the present invention is not limited to this. Also when a counted value by the level sampling circuit 20 or a counted value by the edge sampling circuit 21 is selected using any one of the following methods (A) to (D), the present invention may be applied. Furthermore, the following methods (A) to (D) and the above method using elapsed time may be combined freely.

Method (A) is that a counted value by the level sampling circuit 20 or a counted value by the edge sampling circuit 21 is selected according to an external operation by a measurer. It is considered that switching buttons are provided on the housing of the distance measuring apparatus 10 and the level sampling circuit 20 or the edge sampling circuit 21 is selected according to an operation of the buttons. As the switching buttons, at least one of a short distance priority button and a long distance priority button, for example, may be provided. It is desirable that the edge sampling circuit 21 is forcibly selected when a measurer has directed short distance priority according to an operation of the buttons and the level sampling circuit 20 is selected when a measurer has directed long distance priority according to an operation of the buttons.

Method (B) is that the level sampling circuit 20 or the edge sampling circuit 21 is selected according to a background level estimated by the threshold setting circuit 19 before output of pulsed light L1. Since a background level serves as a guide for the S/N ratio, the background level itself may be used to select the level sampling circuit 20 or the edge sampling circuit 21, or a threshold (FIG. 2(b)) which has been set in the binarizing circuit 18 according to a background level may be used as described above. The threshold setting circuit 19 lowers the setting of a threshold in order to raise the S/N ratio when the background level is low. For this reason, when the reflectivity of a measurement object is high, even if the distance to the measurement object is long, there is a possibility that the amplifier 17 is saturated due to pulsed light reflected thereby, so that it is desirable to select the edge sampling circuit 21. Since the accuracy of the edge sampling circuit 21 is higher than that of the level sampling circuit 20, it is desirable to use edge sampling circuit 21 preferentially even if the distance is long. Furthermore, preliminary light is emitted before output (formal emission) of pulsed light L1 and the level sampling circuit 20 or the edge sampling circuit 21 may be selected according to the intensity of reflected light at that time.

Method (C) is that the level sampling circuit 20 or the edge sampling circuit 21 is selected according to the intensity of returning light obtained when pulsed light Ll is output. Returning light includes pulsed light L2 reflected by a measurement object, pulsed light reflected by other obstacles (e.g. rain and the like), background light, and the like, and becomes a guide of the S/N ratio. For this reason, to select the level sampling circuit 20 or the edge sampling circuit 21, the intensity of returning light itself may be used, the average intensity of returning light may be used, or a threshold for noise reduction responsive to the intensity of returning light may be used. It is desirable that the edge sampling circuit 21 be selected when the intensity of returning light is higher than a predetermined value, and the level sampling circuit 20 be selected when the intensity of returning light is lower than a predetermined value. Furthermore, in this case, preliminary distance measuring is performed before distance measuring and the selection may be performed based on data of returning light of the preliminary distance measuring.

Method (D) is that a counted value of the level sampling circuit 20 or the edge sampling circuit 21 is selected according to frequencies in sections in which counted values (time differences) are less than a predetermined value (sections in which the amplifier 17 is able to be saturated) in a frequency distribution (histogram of FIG. 6) of counted values stored in the memory 24 by output of a plurality of pulsed lights L1. In this case, it is desirable that each of the level sampling circuit 20 and the edge sampling circuit 21 have a dedicated memory in order that the MPU 25 selects counted values stored in either one of the memories when calculating a distance.

Figure 9:
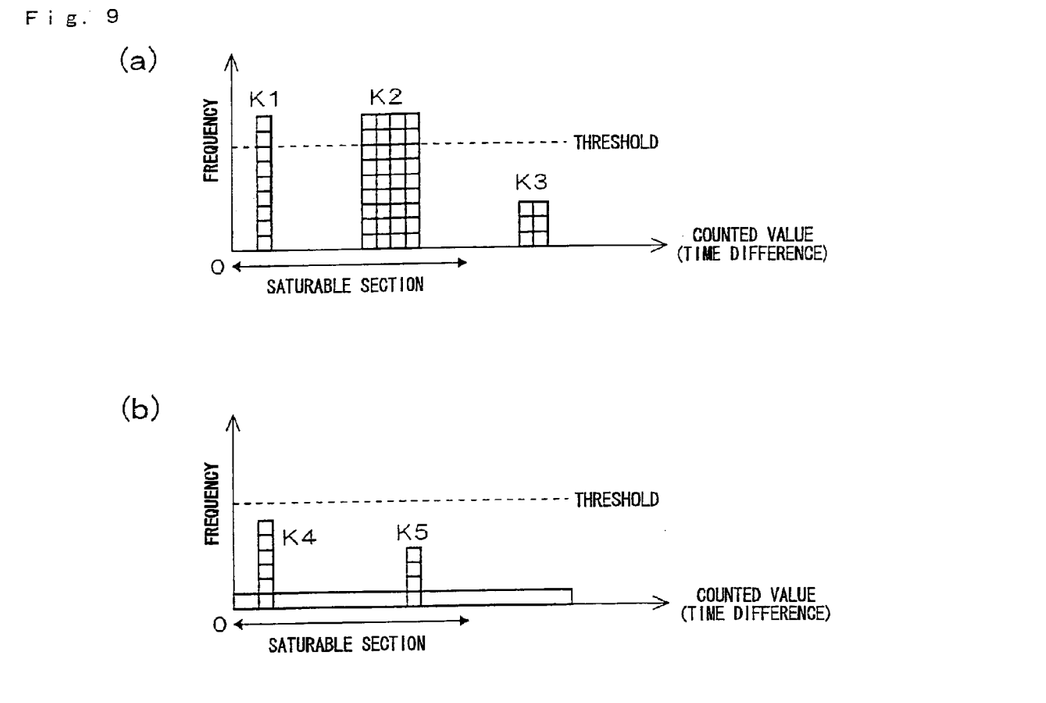
FIG. 9 illustrates an example of a method of selecting counted values of the level sampling circuit 20 or the edge sampling circuit 21.

For example, as shown in FIG. 9(a), when sections in which frequencies are more than a threshold (corresponding to sections K1 and K2 in the figure) exist in a "section which may be saturated" in a frequency distribution in the memory, it is determined that the amplifier 17 is saturated, because there is a tendency that the stronger the returning light including pulsed light L2, the more the frequency increases. A counted value by the edge sampling circuit 21 is then selected. Furthermore, it is desirable that when there are two or more peaks (K1 to K3) in a frequency distribution in the memory, the peak (K1) of a minimum counted value is employed and the peaks (K2 and K3) of counted values larger than it are excluded because they may be abnormal waveforms. In a frequency distribution shown in FIG. 9(b), there is no section in which frequencies are larger than a threshold in the "section which may be saturated", so that it is considered that the amplifier 17 is not saturated, and all peaks (K4 and K5) may be employed as normal waveforms.

Furthermore, in the above embodiment, an example (FIG. 2(b)) of binarizing a time-series signal (FIG. 2(a)) responsive to an intensity variation of returning light by the binarizing circuit 18 is described. However, the present invention is not limited to this. Also when a time difference between output of pulsed light L1 and detection of pulsed light L2 is measured without binarization, the present invention may be applied.

In addition, in the above embodiment, an example of selecting the edge sampling circuit 21 in such a case that the amplifier 17 is saturated is described. However, the present invention is not limited to this. In any other example, there is a case that the characteristics of pulse L2 included in returning light change (for example, the pulse width extends) depending on a measurement object. For example, pulsed light L2 reflected by thick glass or pulsed light L2 from a diffuse reflection surface which is not a plane extends in its pulse width. Also in such a case, distance measurement can be performed accurately by selecting the edge sampling circuit 21 (it is desirable to select it manually by operation of, for example, a switching button).

Furthermore, in the above embodiment, an example of selecting either one of a counted value by the level sampling circuit 20 and a counted value by the edge sampling circuit 21 is described. However, the present invention is not limited to this. Also when a distance is measured using both of a counted value by the level sampling circuit 20 and a counted value by the edge sampling circuit 21, the present invention may be applied.

(Variation 2)

Figure 4:
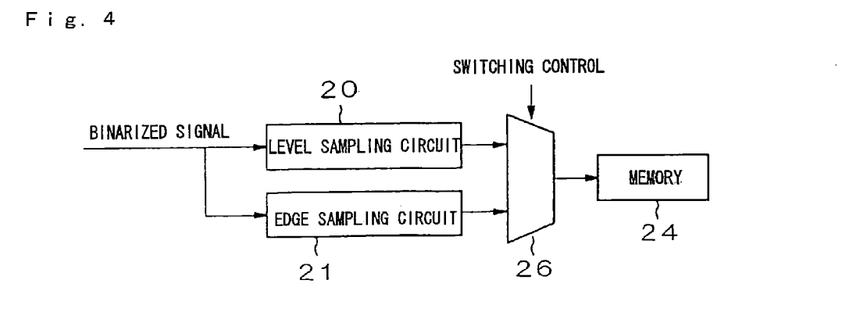
FIG. 4 illustrates a configuration example using a selector 26.

In the above embodiment, it is described that when the S/N ratio decreases and rising edges of the binarized signal become unclear, a counted value output from the edge sampling circuit 21 to the selector 26 in FIG. 4 becomes unclear. However, in this case, an offset amount may be set in advance to correct and display a measured distance value.

(Variation 3)

In the above embodiment, a counted value is output to the memory 24 from the edge sampling circuit 21 before predetermined time t1 passes after output of pulsed light L1, and from the level sampling circuit 20 after the predetermined time t1. However, the present invention is not limited to this.

When it is confirmed that the amplifier will be saturated after the predetermined time t1, or when it is expected in advance that the amplifier will be saturated after the predetermined time t1, a counted value may be output from the edge sampling circuit 21 to the memory 24 after the predetermined time t1 or over the full time domain.

In this case, a means detecting the saturation of the amplifier may be provided. For example, a pulse width in a range to be considered normal of a detected signal is stored in advance, and when an actual pulse width is larger than the pulse width, it is possible that it is determined that level sampling is impossible and the level sampling is switched to edge sampling.

Furthermore, when reflected light of an intensity exceeding a predetermined value enters, edge sampling may be used because it is expected that the amplifier will be saturated. It is desirable that switching between these sampling circuits is automatically controlled according to a detected value. However, it is also possible that a user is noticed to switch the sampling methods and the user who has confirmed this notice switches the sampling methods manually.

In this case, it is recommended that the switching modes of the first and second operation buttons (see operation buttons 31 and 32 in FIG. 10 described next, for example) connected with the MPU 25 of the distance measuring apparatus 10 include the function of switching between an edge sampling mode and a level sampling mode.

(Variation 4)

Figure 10:
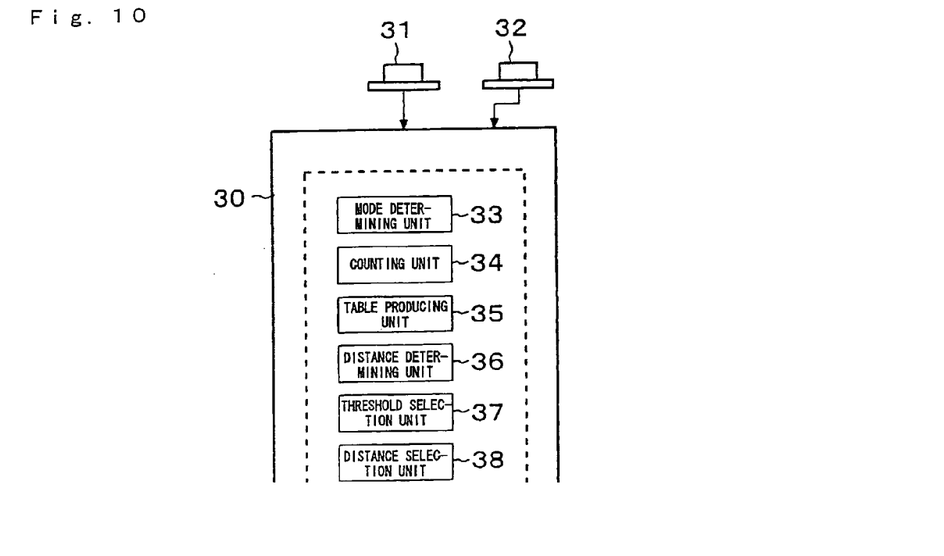

In addition, as shown in FIG. 10, a controller 30 may be provided inside the MPU 25, and operation signals from the first and second operation buttons 31 and 32 may be input to the controller 30. By operating the operation buttons 31 and 32, two kinds of measuring modes described below can be switched. The first measuring mode is a "long-distance mode", and the second measuring mode is a "short-distance mode".

The "long-distance mode" is a mode that a distance to an object most away from the distance measuring apparatus of two or more measured distance values calculated is assumed to be a measured distance value to an object, or a mode that a reflected signal from an object most away from the distance measuring apparatus of two or more reflected signals received in order to calculate a measured distance value is assumed to be a signal to an object and a measured distance value is calculated.

The "short-distance mode" is a mode that a distance to an object nearest from the distance measuring apparatus of two or more measured distance values calculated is assumed to be a measured distance value to an object, or a mode that a reflected signal from an object nearest from the distance measuring apparatus of two or more reflected signals received in order to calculate a measured distance value is assumed to be a signal to an object and a measured distance value is calculated.

The controller 30 includes a distance calculator (33 to 38) calculating a distance to an object to be measured. The distance calculator (33 to 38) includes a mode determining unit 33, a counting unit 34, a table producing unit 35, a distance determining unit 36, a threshold selection unit 37, and a distance selection unit 38.

When the measuring modes are switched by operating the operation buttons 31 and 32, the mode determining unit 33 in the controller 30 determines a measuring mode (long-distance mode or short-distance mode) according to an operation signal from the operation buttons 31 and 32. In order to determine a distance to an object to be measured, a determination threshold on a frequency distribution table (histogram) corresponding to a measuring mode is selected by the threshold selection unit 37 in the controller 30.

When a measuring mode is set to the short-distance mode in advance and the measuring mode is changed to the long-distance mode, the operation button 32 is operated for predetermined time (e.g. 1.5 seconds) and then the operation button 31 is operated for predetermined time (e.g. 2 seconds). In this case, it is determined, on the basis of an operation signal from the operation button 31, by the mode determining unit 33 in the controller 30 that a measuring mode has been set to the long-distance mode. A determination threshold for distance determination corresponding to a selected measuring mode (long-distance mode in this case) is selected by the threshold selection unit 37.

When the long-distance mode has been selected, the controller 30 controls a received signal to be transmitted to the level sampling circuit 20 which is a second measuring unit. Thus, it is understood in advance to receive a long-distance side received signal, so that more accurate processing by level sampling can be performed without the fear of saturation of the short-distance side receiver.

Furthermore, when the short-distance mode has been selected, the controller 30 controls a received signal to be transmitted to the edge sampling circuit 21 which is a first measuring unit. Thus, it is understood in advance to receive a short-distance side received signal, so that the receiver can be prevented from being saturated in advance.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A distance measuring apparatus comprising:
   an output unit outputting a first pulsed light to a measurement object;
   a light detecting unit detecting the first pulsed light that is reflected by said measurement object and outputting a signal that is responsive to an intensity variation of the first pulsed light;
   a first measuring unit measuring time differences between the outputting and the detecting of said first pulsed light by sampling said signal output from said light detecting unit at a predetermined frequency during a period when an intensity of said signal is larger than a predetermined value;
   a second measuring unit measuring, by sampling said signal output from said light detecting unit at the predetermined frequency, a time difference between the outputting and the detecting of the first pulsed light at a time when an intensity of said signal varies from less than the predetermined value to the predetermined value or more; and
   a calculating unit calculating a distance to said measurement object using either the time differences measured by said first measuring unit or the time difference measured by said second measuring unit.

2. The distance measuring apparatus according to claim 1, wherein said calculating unit selects either the time differences measured by said first measuring unit or the time difference measured by said second measuring unit according to elapsed time from output of said first pulsed light to calculate the distance to said measurement object.

3. The distance measuring apparatus according to claim 1, wherein said calculating unit selects either the time differences measured by said first measuring unit or the time difference measured by said second measuring unit according to an external operation by a measurer, and calculates the distance to said measurement object.

4. The distance measuring apparatus according to claim 1, further comprising
   an estimating unit estimating a background level of said first pulsed light before output of the first pulsed light, wherein
   said calculating unit selects either the time differences measured by said first measuring unit or the time difference measured by said second measuring unit according to said background level, and calculates the distance to said measurement object.

5. The distance measuring apparatus according to claim 1, wherein
   said calculating unit selects either the time differences measured by said first measuring unit or the time difference measured by said second measuring unit according to an intensity of said first pulsed light, and calculates the distance to said measurement object.

6. The distance measuring apparatus according to claim 1, wherein:
   said output unit outputs a plurality of said first pulsed lights in sequence; and
   said calculating unit produces a frequency distribution related to at least one of the time difference measured by said second measuring unit and the time differences measured by said first measuring unit, selects either the time differences measured by said first measuring unit or the time difference measured by said second measuring unit according to frequencies in sections in which time differences are less than a predetermined value in the frequency distribution, and calculates the distance to said measurement object.

7. The distance measuring apparatus according to claim 1, wherein:
   said first measuring unit binarizes said signal and measures the time differences by latching an intensity of a signal generated by the binarization at a rising edge of a sampling clock of the predetermined frequency; and
   said second measuring unit binarizes said signal, latches an intensity of a signal generated by the binarization asynchronously with said sampling clock, and then samples said intensity at a first rising edge of the sampling clock and clears said intensity at a second rising edge to measure the time difference.

* * * * *